United States Patent
Jin

(10) Patent No.: US 11,270,489 B2
(45) Date of Patent: *Mar. 8, 2022

(54) EXPRESSION ANIMATION GENERATION METHOD AND APPARATUS, STORAGE MEDIUM, AND ELECTRONIC APPARATUS

(71) Applicant: Tencent Technology (Shenzhen) Company Limited, Shenzhen (CN)

(72) Inventor: Yinggang Jin, Shenzhen (CN)

(73) Assignee: TENCENT TECHNOLOGY (SHENZHEN) COMPANY LIMITED, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,675

(22) Filed: Oct. 12, 2020

(65) Prior Publication Data

US 2021/0027515 A1    Jan. 28, 2021

Related U.S. Application Data

(63) Continuation of application No. 16/553,005, filed on Aug. 27, 2019, now Pat. No. 10,872,452, which is a
(Continued)

(30) Foreign Application Priority Data

Aug. 28, 2017  (CN) .......................... 201710752994.6

(51) Int. Cl.
*G06T 13/40* (2011.01)
*A63F 13/60* (2014.01)
*G06T 17/00* (2006.01)

(52) U.S. Cl.
CPC .............. *G06T 13/40* (2013.01); *A63F 13/60* (2014.09); *G06T 17/00* (2013.01); *A63F 2300/66* (2013.01)

(58) Field of Classification Search
CPC ......... G06T 13/40; G06T 17/00; A63F 13/60; A63F 2300/66
See application file for complete search history.

(56) References Cited

U.S. PATENT DOCUMENTS

| | | | |
|---|---|---|---|
| 2012/0007859 A1 | 1/2012 | Lee et al. | |
| 2013/0127853 A1* | 5/2013 | Corazza | G06T 15/08 345/420 |
| 2016/0358365 A1* | 12/2016 | Sumner | G06T 19/20 |

FOREIGN PATENT DOCUMENTS

| | | |
|---|---|---|
| CN | 105069830 A | 11/2015 |
| CN | 107657651 A | 2/2018 |

(Continued)

OTHER PUBLICATIONS

Tencent Technology, ISRWO, PCT/CN2018/088150, Aug. 13, 2018, 6 pgs.

(Continued)

*Primary Examiner* — Chong Wu
(74) *Attorney, Agent, or Firm* — Morgan, Lewis & Bockius LLP

(57) ABSTRACT

The present disclosure discloses an expression animation generation method performed at a computing device. The method includes: obtaining an object model of a target virtual object; obtain an object control model matching the target virtual object by adapting the obtained object model to a target skeleton, the object control model comprising a plurality of control vertices and a plurality of control skeletons; obtaining an adjustment instruction for the target virtual object; identifying a target control vertex and associated target control skeletons to be adjusted in the object control model according to the adjustment instruction; adjusting the identified target control vertex and the associated target control skeletons in the object control model according to respective control weights of the associated (Continued)

target control skeletons, to obtain an expression frame image of the target virtual object; and generating an expression animation of the target virtual object by using the expression frame image.

12 Claims, 5 Drawing Sheets

Related U.S. Application Data continuation of application No. PCT/CN2018/088150, filed on May 24, 2018.

(56) References Cited

FOREIGN PATENT DOCUMENTS

| JP | 2001209823 A | 8/2001 |
|----|--------------|--------|
| JP | 2010044484 A | 2/2010 |
| JP | 2012043057 A | 3/2012 |
| KR | 20100121420 A | 11/2010 |

OTHER PUBLICATIONS

Tencent Technology, IPRP, PCT/CN2018/088150, Mar. 3, 2020, 5 pgs.

\* cited by examiner

EXPRESSION ANIMATION GENERATION METHOD AND APPARATUS, STORAGE MEDIUM, AND ELECTRONIC APPARATUS

CROSS-REFERENCE TO RELATED APPLICATIONS

This application is a continuation of U.S. patent application Ser. No. 16/553,005, entitled "EXPRESSION ANIMATION GENERATION METHOD AND APPARATUS, STORAGE MEDIUM, AND ELECTRONIC APPARATUS" filed on Aug. 27, 2019, which is a continuation application of PCT/CN2018/088150, entitled "EXPRESSION ANIMATION GENERATION METHOD AND APPARATUS, STORAGE MEDIUM, AND ELECTRONIC APPARATUS" filed on May 24, 2018, which claims priority to Chinese Patent Application No. 201710752994.6, entitled "EXPRESSION ANIMATION GENERATION METHOD AND APPARATUS, STORAGE MEDIUM, AND ELECTRONIC APPARATUS" filed with National Intellectual Property Administration, PRC on Aug. 28, 2017, all of which are incorporated by reference in their entirety.

FIELD OF THE TECHNOLOGY

Embodiments of the present application relate to the field of computers, and specifically, to an expression animation generation method and apparatus, a storage medium, and an electronic apparatus.

BACKGROUND OF THE DISCLOSURE

A plurality of virtual characters of different figures is usually designed in a virtual application world. To make different virtual characters own a wide variety of expression animations, a common manner in the related technology is currently to change or adjust five sense organ shapes of each virtual character by using a local scaling model or by fusing a plurality of models, to generate different expression animations for each virtual character.

However, when an expression animation is generated for the virtual character in the foregoing manner, a developer usually needs to manually debug a model for a plurality of times to generate a needed expression animation. A problem that the generated expression animations are excessively simple because of being limited to complex generation operations is caused.

For the foregoing problem, currently, no effective solution is proposed.

SUMMARY

Embodiments of the present application provide an expression animation generation method and apparatus, a storage medium, and an electronic apparatus, to resolve at least a problem that the generated expression animations are excessively simple because of being limited to complex generation operations.

According to an aspect of the embodiments of the present application, an expression animation generation method is performed at a computing device. The method includes: obtaining an object model of a target virtual object; obtain an object control model matching the target virtual object by adapting the obtained object model to a target skeleton, the object control model comprising a plurality of control vertices and a plurality of control skeletons, each control skeleton being used for controlling a corresponding part of the object control model, and each control vertex being an intersection point two adjacent control skeletons; obtaining an adjustment instruction for the target virtual object; identifying a target control vertex and associated target control skeletons to be adjusted in the object control model according to the adjustment instruction; adjusting the identified target control vertex and the associated target control skeletons in the object control model according to respective control weights of the associated target control skeletons, to obtain an expression frame image of the target virtual object; and generating an expression animation of the target virtual object by using the expression frame image.

Optionally, the adjusting the target control vertex and/or the target control skeleton includes:

adjusting a control weight corresponding to each target control skeleton connected to the target control vertex, the control weight of the target control skeleton indicating a range of an area controlled by the target control skeleton in the object control model; and/or adjusting a display location of the target control skeleton.

Optionally, the generating an expression animation of the target virtual object by using the expression frame image includes:

obtaining a plurality of frames of expression frame images of the target virtual object; and enabling the obtained plurality of frames of expression frame images to generate the expression animation of the target virtual object according to a predetermined sequence.

Optionally, the obtain an object control model matching the target virtual object by adapting the obtained object model to a target skeleton includes:

binding a key point in the obtained object model and the target skeleton, and skinning the object model on the target skeleton, to obtain the object control model matching the target virtual object.

Optionally, the target skeleton includes a general facial skeleton, and the object model includes a facial model.

According to another aspect of the embodiments of the present application, a computing device is further provided for performing the aforementioned expression animation generation method.

According to still another aspect of the embodiments of the present application, a non-transitory computer readable storage medium is further provided. The storage medium is configured to store a plurality of machine readable instructions in connection with a computing device having one or more processors. The plurality of machine readable instructions, when executed by the one or more processors, cause the computing device to perform the aforementioned expression animation generation method.

According to still another aspect of the embodiments of the present application, an electronic apparatus is further provided. The electronic apparatus includes a memory and a processor, the memory being configured to store a program, and the processor being configured to execute the program stored in the memory; and the processor performing, through the program, the expression animation generation method.

Still another aspect of the embodiments of the present application further provides a computer program product including a plurality of machine-readable instructions that, when being run on a computing device, cause the computing device to perform the aforementioned expression animation generation method.

In the expression animation generation method provided in the present application, the obtained object model of the target virtual object is adapted to the general target skeleton, to obtain the object control model matching the target virtual object, the control vertex and/or the control skeleton included in the object control model is adjusted to adjust and control the object control model, to obtain the expression frame image of the target virtual object, and the expression animation of the target virtual object is generated by using the obtained expression frame image.

In the present application, the object model of the target virtual object is adapted to the general target skeleton, and the control skeleton and/or the control vertex in the object control model that is obtained after adaption is directly adjusted, to obtain a wide variety of expression frame images, to generate various valid and real expression animations for the target virtual object, to overcome a problem in the related technology that the generated expression animations are excessively simple.

In the present application, the general target skeleton is used to adapt to object models of different target virtual objects, to obtain object control models corresponding to the target virtual objects, a range of the target virtual objects for generating the expression animation is enlarged, and for a different target virtual object, a wide variety of expression animations may be generated by adjusting a control skeleton and/or a control vertex in a corresponding object control model, to enlarge a use range of an expression animation generation manner and improving generality.

BRIEF DESCRIPTION OF THE DRAWINGS

The accompanying drawings described herein are intended to provide further understanding of the present disclosure and constitute a part of this application. Exemplary embodiments of the present application and the description thereof are used for explaining the present disclosure rather than constituting the improper limitation to the present disclosure. In the accompanying drawings.

DESCRIPTION OF EMBODIMENTS

To make a person skilled in the art understand the solutions in the present disclosure better, the following clearly and completely describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present disclosure.

It should be noted that, the specification and claims of the present disclosure, and terms "first" and "second" in the foregoing accompanying drawings are used for distinguishing similar objects, but are unnecessarily used for describing a specific sequence or order. It should be understood that, data used in this way is exchangeable in a proper case, so that the embodiments of the present application that are described herein can be implemented in another order except those shown or described herein. Moreover, the terms "include", "contain" and any other variants mean to cover the non-exclusive inclusion. For example, a process, method, system, product, or device that includes a series of steps or units is not necessarily limited to those steps or units that are expressly listed, but may include other steps or units not expressly listed or inherent to such a process, method, product, or device.

Figure 1:
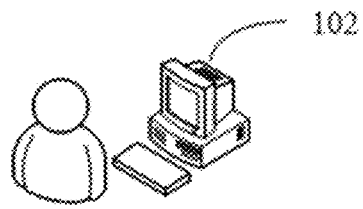
FIG. 1 is a schematic diagram of an application environment of an optional expression animation generation method according to an embodiment of the present application.

In the embodiments of the present application, an embodiment of the foregoing expression animation generation method is provided. In an optional implementation, the expression animation generation method may not be limited to being applied to the application environment shown in FIG. 1. An expression animation edition application is run in the terminal 102, and in the application, an object model of a target virtual object is obtained, and the object model is adapted to a target skeleton, to obtain an object control model matching the target virtual object. The object control model includes a control vertex and a control skeleton. The control vertex is an intersection point of the control skeleton. Each control skeleton is used for controlling a part of an area in the object control model. The control vertex and/or control skeleton in the object control model is adjusted according to an obtained adjustment instruction, to obtain an expression frame image of the target virtual object. Then, an expression animation of the target virtual object is generated by using the expression frame image.

In this embodiment, the obtained object model of the target virtual object is adapted to the general target skeleton, to obtain the object control model matching the target virtual object, the control vertex and/or the control skeleton included in the object control model is adjusted to adjust and control the object control model, to obtain the expression frame image of the target virtual object, and the expression animation of the target virtual object is generated by using the obtained expression frame image. That is, the object model of the target virtual object is adapted to the general target skeleton, and the control skeleton and/or the control vertex in the object control model that is obtained after adaption is directly adjusted, to obtain a wide variety of expression frame images, to generate various valid and real expression animations for the target virtual object, to overcome a problem in the related technology that the generated expression animations are excessively simple. The general target skeleton is used to adapt to object models of different target virtual objects, to obtain object control models corresponding to the target virtual objects, a range of the target virtual objects for generating the expression animation is enlarged, and for a different target virtual object, a wide variety of expression animations may be generated by adjusting a control skeleton and/or a control vertex in a corresponding object control model, to enlarge a use range of an expression animation generation manner and improving generality.

Optionally, in this embodiment, the terminal 102 may include but is not limited to at least one of the following: a mobile phone, a tablet computer, a notebook computer, a desktop PC, and another hardware device for generating an expression animation. This is only an example and is not limited in this embodiment.

Figure 2:
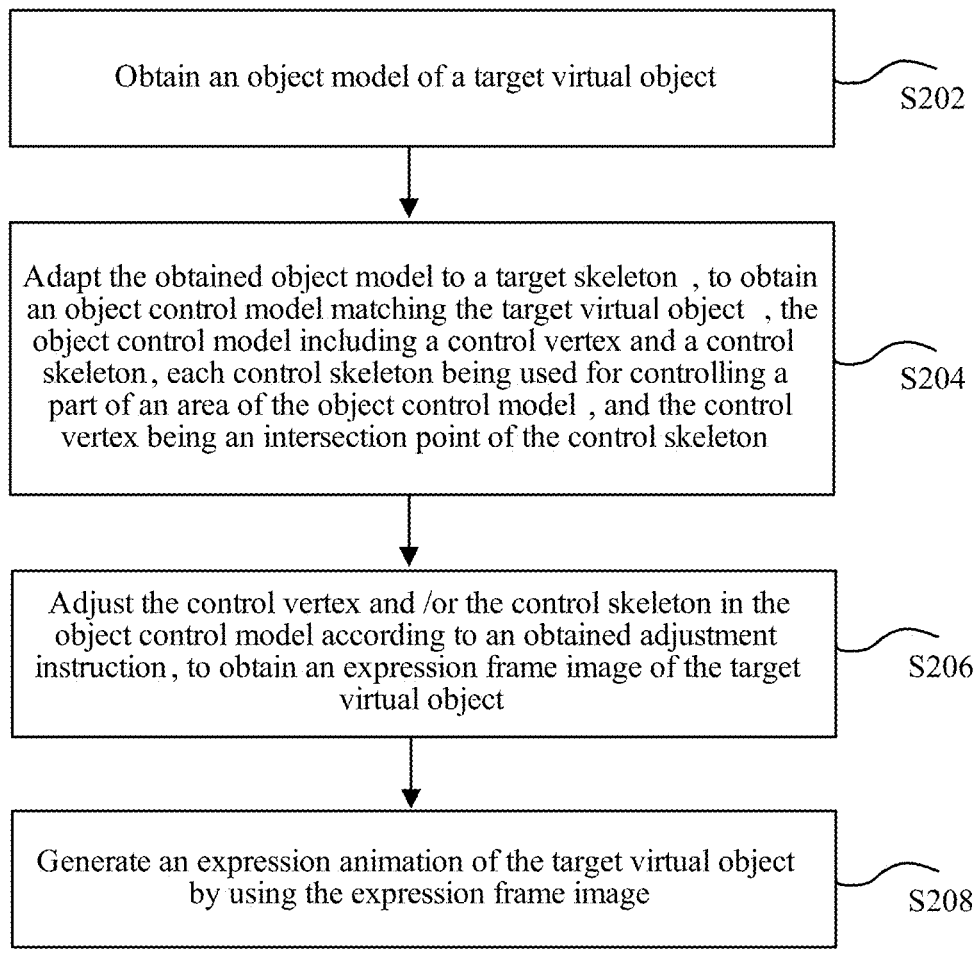
FIG. 2 is a flowchart of an optional expression animation generation method according to an embodiment of the present application.

This embodiment of the present application provides an expression animation generation method. As shown in FIG. 2, the method includes:

S202: Obtain an object model of a target virtual object.

S204: Adapt the obtained object model to a target skeleton, to obtain an object control model matching the target virtual object, the object control model including a control vertex and a control skeleton, each control skeleton being used for controlling a part of an area of the object control model, and the control vertex being an intersection point of the control skeleton.

S206: Adjust the control vertex and/or the control skeleton in the object control model according to an obtained adjustment instruction, to obtain an expression frame image of the target virtual object.

S208: Generate an expression animation of the target virtual object by using the expression frame image.

Optionally, in this embodiment, the expression animation generation method may be, but not limited to, applied to an application in which an expression animation needs to be edited, for example, be applied to a game application. Using an example in which the target virtual object is a virtual game role object in a game application, in the expression animation generation method, a plurality of different expression animations is generated for the game role object. The object model (such as a three-dimensional model of the game role object) of the game role object is obtained, the object model is adapted to the general target skeleton, to obtain the object control model matching the game role object, to obtain the corresponding expression frame image by adjusting the control vertex and/or the control skeleton in the object control model, to generate the expression animation of the game role object by using the expression frame image. This is only an example and is not limited in this embodiment.

It should be noted that the object model of the target virtual object is adapted to the general target skeleton, and the control skeleton and/or the control vertex in the object control model that is obtained after adaption is directly adjusted, to obtain a wide variety of expression frame images, to generate various valid and real expression animations for the target virtual object, to overcome a problem in the related technology that the generated expression animations are excessively simple. The general target skeleton is used to adapt to object models of different target virtual objects, to obtain object control models corresponding to the target virtual objects, a range of the target virtual objects for generating the expression animation is enlarged, and for a different target virtual object, a wide variety of expression animations may be generated by adjusting a control skeleton and/or a control vertex in a corresponding object control model, to enlarge a use range of an expression animation generation manner and improving generality.

Optionally, in this embodiment, the target skeleton may be, but not limited to, a same general skeleton. That is, object models of different target virtual objects may be, but not limited to, adapted to the general target skeleton, to obtain object control models respectively corresponding to the target virtual objects, to adjust the control vertex and/or the control skeleton in the object control model, to adjust and control the expression frame image of the target virtual object, to obtain a wide variety of expression animations. For example, using an example in which the target skeleton is a general facial skeleton, facial models of different face shapes may be, but not limited to, adapted to the general facial skeleton, to control generation of expression animations corresponding to different face shapes by using the general facial skeleton, to enrich patterns of expression animations and improving generality of an expression animation generation process.

Optionally, in this embodiment, the control vertex and/or the control skeleton in the object control model may be, but not limited to, a key element for controlling the expression frame image of the target virtual object in the object control model obtained after the object model is adapted to the target skeleton. Different expression animations may be generated for the target virtual object by adjusting the control vertex and/or the control skeleton in the object control model matching the target virtual object.

In addition, it should be noted that the expression animation may be, but not limited to, dynamic expressions that continuously change and that are generated by N frames of expression frame images according to a predetermined sequence. This is only an example and is not limited in this embodiment.

It should be noted that the target skeleton may include but not limited to: a general whole-body skeleton and a general facial skeleton. That is, the generated expression animation may include an expression animation composed of actions of the whole body or may include an expression animation composed of five sense organ shapes. This is not limited in this embodiment.

In an optional solution, the adjusting the control vertex and/or the control skeleton in the object control model according to an obtained adjustment instruction, to obtain an expression frame image of the target virtual object includes:

S1: repeating the following steps until the expression frame image is obtained:

S12: determining, according to the adjustment instruction, a target control vertex and/or a target control skeleton to be adjusted in the object control model; and S14: adjusting the target control vertex and/or the target control skeleton.

Optionally, in this embodiment, S14: adjust the target control vertex and/or the target control skeleton includes but not limited to:

1) adjusting a control weight corresponding to each target control skeleton connected to the target control vertex, a larger control weight of the target control skeleton indicating a larger range of an area controlled by the target control skeleton in the object control model; and/or 2) adjusting a display location of the target control skeleton.

Figure 3:
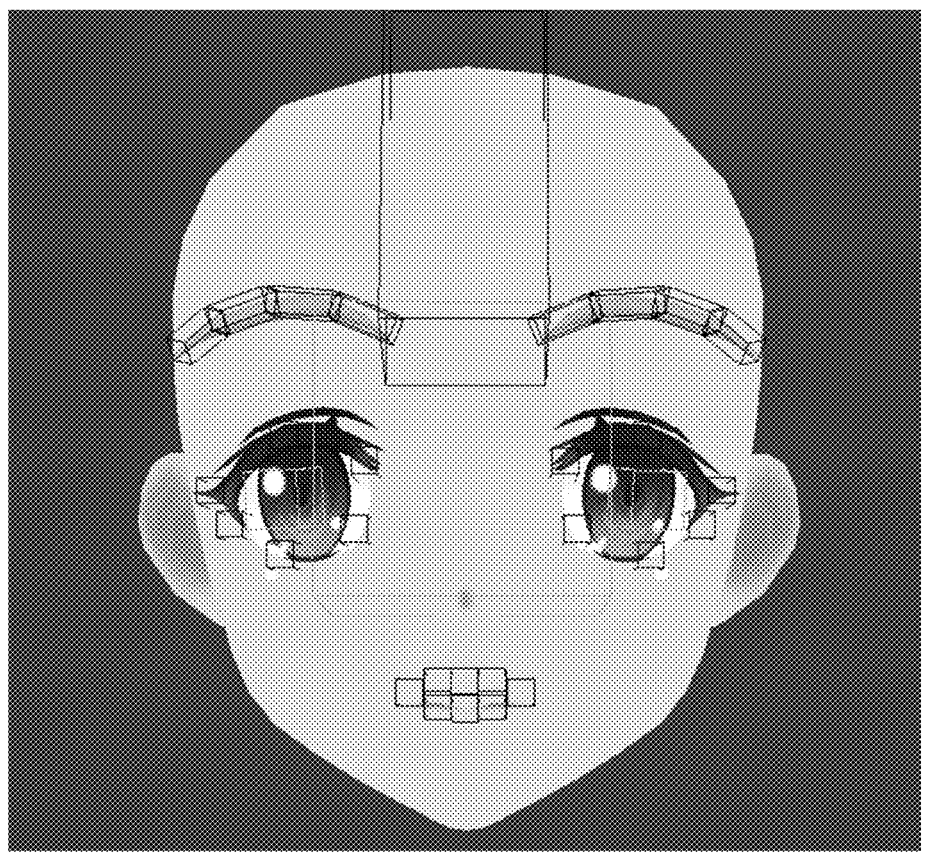
FIG. 3 is a schematic effect diagram of an optional expression animation generation method according to an embodiment of the present application.

For example, as shown in FIG. 3, using an example in which the target skeleton is the general facial skeleton, a corresponding object control model is a facial control model. The control skeleton is a facial control skeleton. The control vertex is a facial control vertex. Ranges of areas controlled by the facial control skeletons in the object control model are determined by adjusting control weights corresponding to the facial control skeletons connected to the facial control vertex shown in FIG. 3. A larger control weight indicates a larger range of a controlled area. This embodiment may further include but not limited to, continuing adjusting a display location of the facial control skeleton, to change display forms of five sense organs on a face, to obtain corresponding expression frame images. For example, a display location of a brow bone (a control skeleton of an eyebrow) shown in FIG. 3 is adjusted, to change a display location of the eyebrow on the face, to obtain the expression frame image after adjustment. After a combination of a plurality of frames of expression frame images is obtained, a corresponding dynamic expression animation is generated.

Optionally, in this embodiment, the adapting the obtained object model to a target skeleton, to obtain an object control model matching the target virtual object includes: binding a key point in the obtained object model and the target skeleton, and skinning the object model on the target skeleton, to obtain the object control model matching the target virtual object.

It should be noted that in this embodiment, each control skeleton is used for controlling a part of an area in the object control model, to form different five sense organ shapes of a face, such as a nose shape, a mouth shape, eyes, and a forehead. In this embodiment, a same general target skeleton is used to adapt to object models of different target virtual objects, and the control vertexes and control skeletons in the obtained object control model are adjusted, to change five sense organ features of the object control model, to obtain different expressions of the target virtual object.

Figure 4:
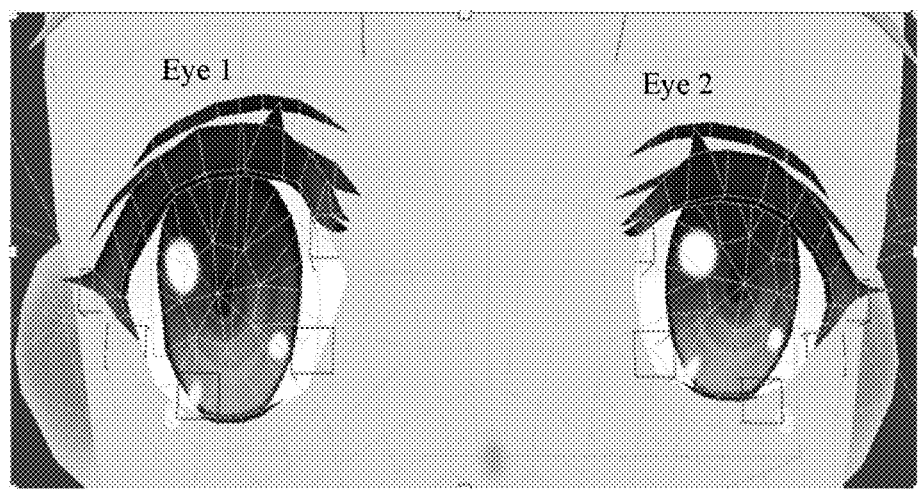
FIG. 4 is a schematic effect diagram of another optional expression animation generation method according to an embodiment of the present application.

The control weights of the control skeletons connected to the control vertexes are used for determining strength control of each control skeleton on a corresponding control vertex. For example, as shown in FIG. 4, near a skeleton at eye locations of an eye 1 and an eye 2, a dark control vertex indicates a strong control force, and a light control vertex indicates a weak control force. Therefore, a control range of the control skeleton near the eyes can be seen. Assuming that the eye 1 and the eye 2 match by using a same skeleton, an initial object model of the eye 1 is large, an initial object model of the eye 2 is small, amplitudes of current blinking of the two eyes are the same, and skeleton movements are the same. To use a same eye skeleton to adapt the eye 1 and the eye 2, the control weight of the control vertex may be adjusted, so that the generated expression is general.

Figure 5:
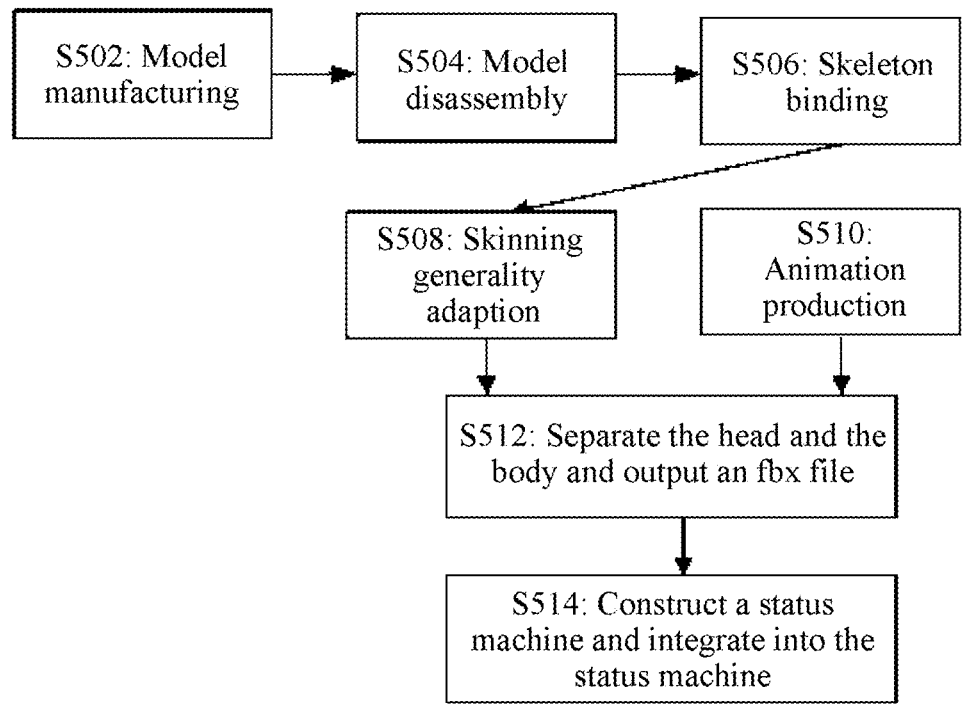
FIG. 5 is a flowchart of another optional expression animation generation method according to an embodiment of the present application.

Descriptions are specifically made with reference to the example shown in FIG. 5. Still using an example of generating a facial expression animation of a game role object in a game application. A process of generating the expression animation may be as follows:

S502: Model manufacturing. A two-dimensional model of the game role object is physically converted into a three-dimensional object model by using an edition tool in 3DSMAX software. The 3DSMAX software is application software used for manufacturing a 3D model, an animation, special effects, and the like.

S504: Model disassembly. The manufactured object model is disassembled into two parts: a head object model and a body object model.

S506: Skeleton binding. The disassembled object model is adapted to a target skeleton.

S508: Skinning generality adaption. The object model is skinned to the target skeleton, to obtain the object control model, and the control weight of the control vertex is adjusted by controlling movement and rotation of the control skeleton in the object control model, to achieve an objective of adaption.

S510: Animation production. A dynamic expression animation is generated by using a plurality of frames of expression frame images obtained after the object control model is adjusted in the 3DSMAX software.

S512: Separate the head and the body and output an fbx file. The produced expression animation is separated into a head animation and a body animation to output two fbx files. It should be noted that the expression animation may include but not limited to: a facial expression animation and a whole-body expression animation. That is, different body shapes may also be included in the expression animation of the object. This is only an example and is not limited in this embodiment.

Figure 6:
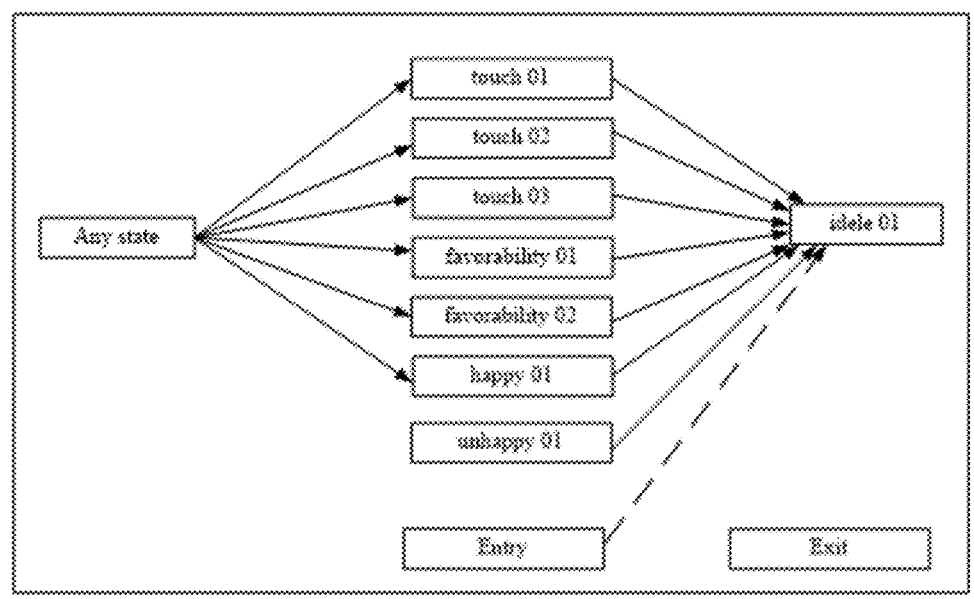
FIG. 6 is a schematic diagram of an operation interface of an optional expression animation generation method according to an embodiment of the present application.
Figure 7:
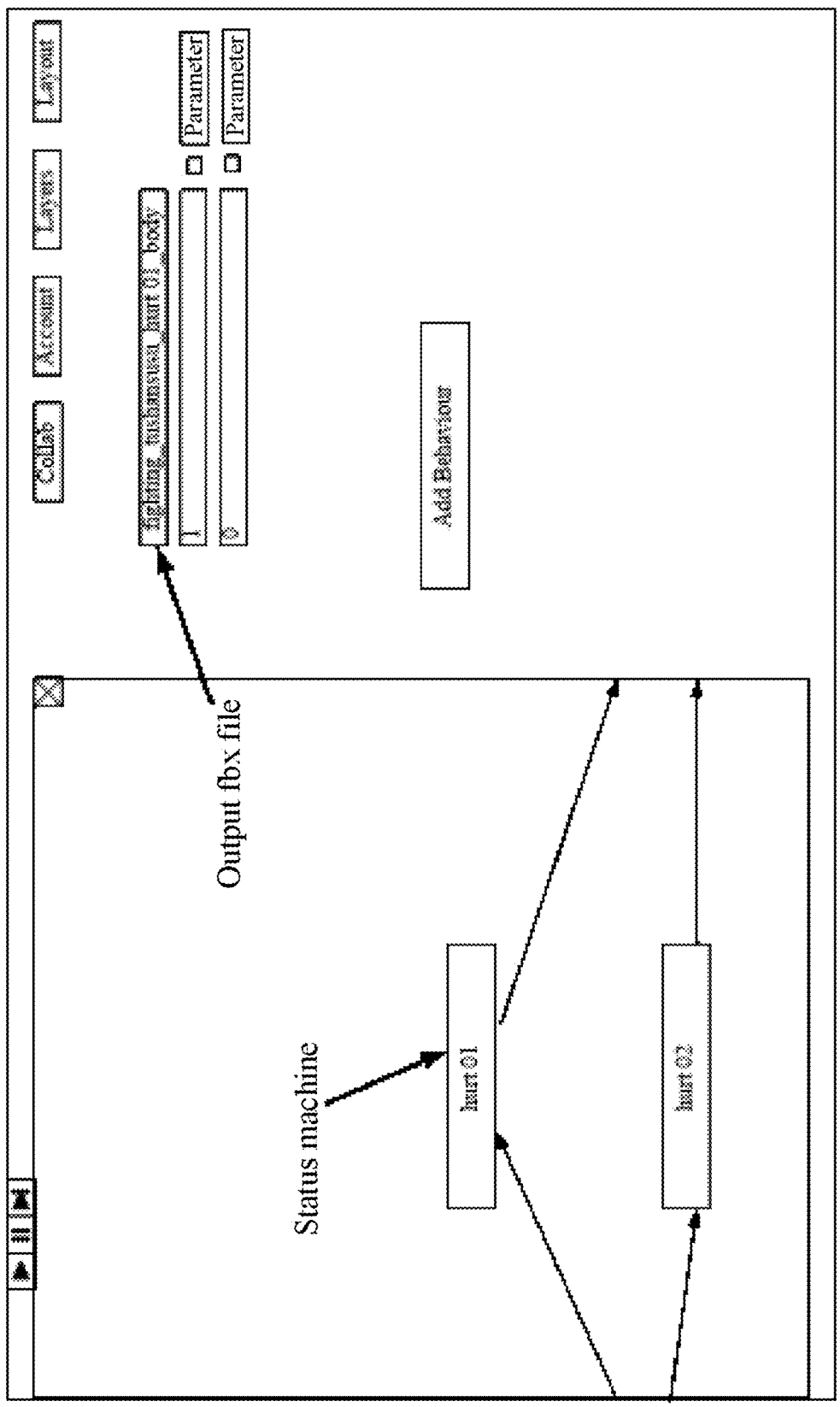
FIG. 7 is a schematic diagram of an operation interface of another optional expression animation generation method according to an embodiment of the present application.

S514: Construct a status machine and integrate into the status machine. In unity engine software, an animation status machine having an effect shown in FIG. 6 is constructed, and the generated expression animation is integrated and output to the corresponding status machine. An effect is shown in FIG. 7.

In this embodiment provided by this application, the object model of the target virtual object is adapted to the general target skeleton, and the control skeleton and/or the control vertex in the object control model that is obtained after adaption is directly adjusted, to obtain a wide variety of expression frame images, to generate various valid and real expression animations for the target virtual object, to overcome a problem in the related technology that the generated expression animations are excessively simple. The general target skeleton is used to adapt to object models of different target virtual objects, to obtain object control models corresponding to the target virtual objects, a range of the target virtual objects for generating the expression animation is enlarged, and for a different target virtual object, a wide variety of expression animations may be generated by adjusting a control skeleton and/or a control vertex in a corresponding object control model, to enlarge a use range of an expression animation generation manner and improving generality.

It should be noted that in this embodiment, the control vertex and/or the control skeleton in the object control model is adjusted according to different adjustment instructions, to obtain one frame of needed expression frame image. After a plurality of frames of expression frame images is obtained, the plurality of frames of expression frame images may be combined, and a dynamic expression animation is generated according to a predetermined sequence.

For example, still using an example of generating a facial expression animation of a game role object in a game application, in a game engine for edition, the target control skeleton to be adjusted in the object control model matching the game role object may be determined according to the adjustment instruction, and then the display location of the target control skeleton on a face of the game role object, to obtain the expression frame image after adjustment.

For another example, still using an example of generating a facial expression animation of a game role object in a game application, in a game engine for edition, the target control vertex to be adjusted in the object control model matching the game role object may be determined according to the adjustment instruction, and then control weights corresponding to the target control skeletons connected to the target control vertex are directly adjusted. Assuming that the target control vertex is connected to four target control skeletons, such as a skeleton A to a skeleton D, corresponding control weights are respectively 0.1, 0.2, 0.3, and 0.4. The skeleton D has the largest control weight, a range of an area controlled by the skeleton D is the largest, and the skeleton D has the strongest control force; those for the skeleton C to the skeleton A sequentially decrease. Display locations of the skeletons are then adjusted according to the adjustment instruction, and control areas corresponding to the skeletons have different change degrees, to obtain the expression frame image after adjustment.

In this embodiment of this application, the control weight on the target control skeleton and/or target control vertex is adjusted, to obtain a wide variety of expression frame images, so that the target virtual object owns various expression animations, so that the expression animations of the target virtual object are more real and vivid.

In an optional solution, the generating an expression animation of the target virtual object by using the expression frame image includes:

S1: obtaining a plurality of frames of expression frame images of the target virtual object; and S2: enabling the plurality of frames of expression frame images to generate the expression animation of the target virtual object according to a predetermined sequence.

It should be noted that in this embodiment, the expression animation may be, but not limited to, dynamic expressions that continuously change and that are generated by a plurality of frames of expression frame images according to a predetermined sequence. For example, the plurality of frames of expression frame images is respectively a frame A: the corner of the mouth is closed, a frame B: the corner of the mouth moves upward, a frame C: the mouth is opened and teeth are exposed. Then, an expression animation "laugh" matching the target virtual object (for example, exclusive to a game character) may be generated according to a predetermined sequence.

In this embodiment provided in this application, the obtained plurality of expression frame images is enabled to generate the expression animation of the target virtual object according to a predetermined sequence, to generate a wide variety of expression animations for different target virtual objects, to generalize a generation process.

In an optional solution, the adapting the obtained object model to a target skeleton, to obtain an object control model matching the target virtual object includes:

S1: binding a key point in the obtained object model and the target skeleton, and skinning the object model on the target skeleton, to obtain the object control model matching the target virtual object.

Optionally, in this embodiment, the key point in the object model may include, but not limited to, a key location in the object model. Using the facial object model as an example, the key location may include, but not limited to, locations at which five sense organs (eyes, eyebrows, a nose, a mouth, and ears) are located. The key point in the object model is bound with a corresponding location on the general target skeleton, and then skinning is performed on the target skeleton, to obtain the object control model matching the target virtual object. The object control model includes the control vertex and the control skeleton used for adjusting and controlling the target virtual object.

Then, the following operations are repeated: determining a target control vertex and/or a target control skeleton to be adjusted, and obtaining a plurality of frames of expression frame images through a plurality of times of adjustment, to generate an expression animation that matches the target virtual object and that continuously changes.

In this embodiment provided in this application, the general target skeleton is adapted to object models of different target virtual objects, to obtain object control models corresponding to the target virtual objects, a range of the target virtual objects for generating the expression animation is enlarged, to generate a wide variety of expression animations for different target virtual objects, further improving generality of the expression animation generation method.

It should be noted that, for ease of description, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, a person skilled in the art should also understand that the embodiments described in this specification all belong to exemplary embodiments, and the involved actions and modules are not necessarily mandatory to the present disclosure.

Based on the foregoing descriptions of the embodiments, a person skilled in the art may clearly understand that the method in the foregoing embodiments may be implemented by software in addition to a necessary universal hardware platform or by hardware only. However, the former is a better implementation in most cases. Based on such an understanding, the technical solutions of the present disclosure or the part that makes contributions to the existing technology may be substantially embodied in the form of a software product. The computer software product is stored in a storage medium (for example, a read-only memory (ROM)/random access memory (RAM), a magnetic disk, or an optical disc), and contains several instructions for instructing a terminal device (which may be a mobile phone, a computer, a server, or a network device) to perform the method according to the embodiments of the present application.

In addition, according to the embodiments of the present application, an expression animation generation apparatus for performing the expression animation generation method is further provided. Refer to the example described in the foregoing method embodiments. Details are not described herein again in this embodiment.

Figure 8:
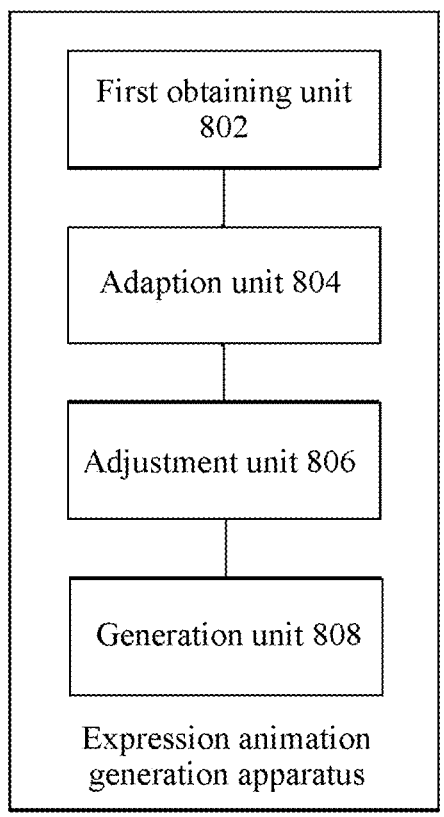
FIG. 8 is a schematic diagram of an optional expression animation generation apparatus according to an embodiment of the present application.

As shown in FIG. 8, the apparatus includes:

1) a first obtaining unit 802, configured to obtain an object model of a target virtual object;

2) an adaption unit 804, configured to adapt the obtained object model to a target skeleton, to obtain an object control model matching the target virtual object, the object control model including a control vertex and a control skeleton, each control skeleton being used for controlling a part of an area of the object control model, and the control vertex being an intersection point of the control skeleton;

3) an adjustment unit 806, configured to adjust the control vertex and/or the control skeleton in the object control model according to an obtained adjustment instruction, to obtain an expression frame image of the target virtual object; and 4) a generation unit 808, configured to generate an expression animation of the target virtual object by using the expression frame image.

In an optional solution, the adjustment unit 806 includes:

1) a processing module, configured to repeat the following steps until the expression frame image of the target virtual object is obtained: determining, according to the obtained adjustment instruction, a target control vertex and/ or a target control skeleton to be adjusted in the object control model; and adjusting the target control vertex and/or the target control skeleton.

Optionally, in this embodiment, the processing module includes:

(1) a first adjustment sub-module, configured to adjust a control weight corresponding to each target control skeleton connected to the target control vertex, a larger control weight of the target control skeleton indicating a larger range of an area controlled by the target control skeleton in the object control model; and/or (2) a second adjustment sub-module, configured to adjust a display location of the target control skeleton.

In an optional solution, the generation unit 808 includes:

1) an obtaining module, configured to obtain a plurality of frames of expression frame images of the target virtual object; and 2) a generation module, configured to enable the obtained plurality of frames of expression frame images to generate the expression animation of the target virtual object according to a predetermined sequence.

In an optional solution, the adaption unit 804 includes:

1) an adaption module, configured to bind a key point in the obtained object model and the target skeleton, and skin the object model on the target skeleton, to obtain the object control model matching the target virtual object.

Figure 9:
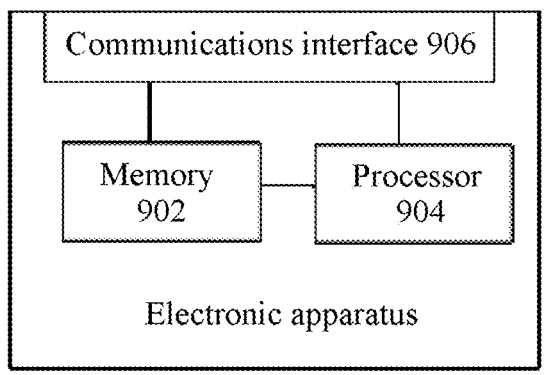
FIG. 9 is a schematic diagram of an optional electronic apparatus according to an embodiment of the present application.

According to this embodiment of the present application, an electronic apparatus for performing expression animation generation is further provided. As shown in FIG. 9, the electronic apparatus includes a memory 902, a processor 904, and a computer program stored on the memory and capable of being run on the processor, and further includes a communications interface 906 for transmission.

1) The communications interface 906 is configured to obtain an object model of a target virtual object.

2) The processor 904 is connected to the communications interface 906 and is configured to: adapt the obtained object model to a target skeleton, to obtain an object control model matching the target virtual object, the object control model including a control vertex and a control skeleton, each control skeleton being used for controlling a part of an area of the object control model, and the control vertex being an intersection point of the control skeleton; the processor 904 is further configured to: adjust the control vertex and/or the control skeleton in the object control model according to an obtained adjustment instruction, to obtain an expression frame image of the target virtual object; and the processor 904 is further configured to: generate an expression animation of the target virtual object by using the expression frame image.

3) The memory 902 is connected to the communications interface 906 and the processor 904 and is configured to store the expression animation of the target virtual object.

For a specific example in this embodiment, refer to the examples described in Embodiment 1 and Embodiment 2, and details are not described herein again in this embodiment.

This embodiment of the present application further provides a storage medium. Optionally, in this embodiment, the storage medium may be located in at least one of a plurality of network devices in a network.

Optionally, in this embodiment, the storage medium is configured to store program code for performing the following steps:

S1: obtaining an object model of a target virtual object;

S2: adapting the obtained object model to a target skeleton, to obtain an object control model matching the target virtual object, the object control model including a control vertex and a control skeleton, each control skeleton being used for controlling a part of an area of the object control model, and the control vertex being an intersection point of the control skeleton;

S3: adjusting the control vertex and/or the control skeleton in the object control model according to an obtained adjustment instruction, to obtain an expression frame image of the target virtual object; and S4: generating an expression animation of the target virtual object by using the expression frame image.

Optionally, the storage medium is further configured to store program code used for performing the following step:

S1: repeating the following steps until the expression frame image of the target virtual object is obtained: determining, according to the obtained adjustment instruction, a target control vertex and/or a target control skeleton to be adjusted in the object control model; and adjusting the target control vertex and/or the target control skeleton.

Optionally, the storage medium is further configured to store program code used for performing the following steps:

adjusting a control weight corresponding to each target control skeleton connected to the target control vertex, a larger control weight of the target control skeleton indicating a larger range of an area controlled by the target control skeleton in the object control model; and/or adjusting a display location of the target control skeleton.

Optionally, the storage medium is further configured to store program code used for performing the following step:

obtaining a plurality of frames of expression frame images of the target virtual object; and enabling the obtained plurality of frames of expression frame images to generate the expression animation of the target virtual object according to a predetermined sequence.

Optionally, the storage medium is further configured to store program code used for performing the following step:

binding a key point in the obtained object model and the target skeleton, and skinning the object model on the target skeleton, to obtain the object control model matching the target virtual object.

Optionally, in this embodiment, the storage medium may include, but is not limited to: any medium that can store program code, such as a USB flash drive, a read only memory (ROM), a random access memory (RAM), a removable hard disk, a magnetic disk, or an optical disc.

According to another aspect, an embodiment of the present application further provides a computer program product including an instruction, when being run on a computer, causing the computer to perform the expression animation generation described in any of the foregoing embodiments.

For a specific example in this embodiment, refer to the examples described in Embodiment 1 and Embodiment 2, and details are not described herein again in this embodiment.

The sequence numbers of the preceding embodiments of the present application are merely for description purpose but do not indicate the preference of the embodiments.

If the integrated units in the foregoing embodiments are implemented in a form of software functional units and are sold or used as an independent product, the units may be stored in a computer readable storage medium. Based on such an understanding, the technical solutions of the present disclosure essentially, or the part contributing to the existing technology, or all or some of the technical solutions may be represented in a form of a software product. The computer software product is stored in a storage medium and includes several instructions for instructing one or more computer devices (which may be a personal computer, a server, or a network device) to perform all or some of the steps of the methods in the embodiments of the present application.

In the foregoing embodiments of the present application, the descriptions of the embodiments have respective focuses. For a part not described in detail in an embodiment, refer to a related description of another embodiment.

In the several embodiments provided in the present application, it should be understood that the disclosed client may be implemented in other manners. The described apparatus embodiments are merely schematic. For example, division of the units is merely division of logic functions, and there may be another division manner during actual implementation. For example, multiple units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated units may be implemented in a form of hardware or may be implemented in a form of a software functional unit.

The foregoing descriptions are merely preferred implementations of the present disclosure. It should be noted that a person of ordinary skill in the art may make several improvements or polishing without departing from the principle of the present disclosure, and the improvements or polishing shall also fall within the protection scope of the present disclosure.

What is claimed is:

1. An expression animation generation method performed at a computing device having one or more processors and memory storing programs to be executed by the one or more processors, comprising:
   obtaining an object model of a target virtual object;
   obtaining an object control model matching the target virtual object by adapting the obtained object model to a target skeleton, the object control model comprising a plurality of control vertices and a plurality of control skeletons, each control skeleton being used for controlling a corresponding part of the object control model, and each control vertex being an intersection point of two adjacent control skeletons;
   obtaining an adjustment instruction for the target virtual object;
   identifying a target control vertex and associated target control skeletons to be adjusted in the object control model according to the adjustment instruction;
   adjusting the identified target control vertex and the associated target control skeletons in the object control model according to respective control weights of the associated target control skeletons, to obtain an expression frame image of the target virtual object; and
   generating an expression animation of the target virtual object by using the expression frame image, wherein the adjusting the identified target control vertex and the associated target control skeletons comprises:
   adjusting a control weight corresponding to each target control skeleton connected to the target control vertex, the control weight of the target control skeleton indicating a range of an area controlled by the target control skeleton in the object control model, a larger control weight of the target control skeleton indicating a larger range of an area controlled by the target control skeleton in the object control model; and
   adjusting a display location of the target control skeleton.

2. The method according to claim 1, wherein the generating an expression animation of the target virtual object by using the expression frame image comprises:
   obtaining a plurality of frames of expression frame images of the target virtual object; and
   enabling the obtained plurality of frames of expression frame images to generate the expression animation of the target virtual object according to a predetermined sequence.

3. The method according to claim 1, wherein the obtaining an object control model matching the target virtual object by adapting the obtained object model to a target skeleton comprises:
   binding a key point in the obtained object model and the target skeleton, and skinning the object model on the target skeleton, to obtain the object control model matching the target virtual object.

4. The method according to claim 1, wherein the target skeleton comprises a general facial skeleton, and the object model comprises a facial model.

5. A computing device comprising one or more processors, memory coupled to the one or more processors and a plurality of programs stored in the memory that, when executed by the one or more processors, cause the computing device to perform a plurality of operations comprising:
   obtaining an object model of a target virtual object;
   obtain an object control model matching the target virtual object by adapting the obtained object model to a target skeleton, the object control model comprising a plurality of control vertices and a plurality of control skeletons, each control skeleton being used for controlling a corresponding part of the object control model, and each control vertex being an intersection point two adjacent control skeletons;
   obtaining an adjustment instruction for the target virtual object;
   identifying a target control vertex and associated target control skeletons to be adjusted in the object control model according to the adjustment instruction;
   adjusting the identified target control vertex and the associated target control skeletons in the object control model according to respective control weights of the associated target control skeletons, to obtain an expression frame image of the target virtual object; and
   generating an expression animation of the target virtual object by using the expression frame image, wherein the adjusting the identified target control vertex and the associated target control skeletons comprises:
   adjusting a control weight corresponding to each target control skeleton connected to the target control vertex, the control weight of the target control skeleton indicating a range of an area controlled by the target control skeleton in the object control model, a larger control weight of the target control skeleton indicating a larger range of an area controlled by the target control skeleton in the object control model; and adjusting a display location of the target control skeleton.

6. The computing device according to claim 5, wherein the generating an expression animation of the target virtual object by using the expression frame image comprises:

obtaining a plurality of frames of expression frame images of the target virtual object; and enabling the obtained plurality of frames of expression frame images to generate the expression animation of the target virtual object according to a predetermined sequence.

7. The computing device according to claim 5, wherein the obtain an object control model matching the target virtual object by adapting the obtained object model to a target skeleton comprises:

binding a key point in the obtained object model and the target skeleton, and skinning the object model on the target skeleton, to obtain the object control model matching the target virtual object.

8. The computing device according to claim 5, wherein the target skeleton comprises a general facial skeleton, and the object model comprises a facial model.

9. A non-transitory computer readable storage medium storing a plurality of machine readable instructions in connection with a computing device having one or more processors, wherein the plurality of machine readable instructions, when executed by the one or more processors, cause the computing device to perform a plurality of operations including:

obtain an object control model matching the target virtual object by adapting the obtained object model to a target skeleton, the object control model comprising a plurality of control vertices and a plurality of control skeletons, each control skeleton being used for controlling a corresponding part of the object control model, and each control vertex being an intersection point two adjacent control skeletons;

obtaining an adjustment instruction for the target virtual object;

identifying a target control vertex and associated target control skeletons to be adjusted in the object control model according to the adjustment instruction;

adjusting the identified target control vertex and the associated target control skeletons in the object control model according to respective control weights of the associated target control skeletons, to obtain an expression frame image of the target virtual object; and generating an expression animation of the target virtual object by using the expression frame image, wherein the adjusting the identified target control vertex and the associated target control skeletons comprises:

adjusting a control weight corresponding to each target control skeleton connected to the target control vertex, the control weight of the target control skeleton indicating a range of an area controlled by the target control skeleton in the object control model, a larger control weight of the target control skeleton indicating a larger range of an area controlled by the target control skeleton in the object control model; and adjusting a display location of the target control skeleton.

10. The non-transitory computer readable storage medium according to claim 9, wherein the generating an expression animation of the target virtual object by using the expression frame image comprises:

obtaining a plurality of frames of expression frame images of the target virtual object; and enabling the obtained plurality of frames of expression frame images to generate the expression animation of the target virtual object according to a predetermined sequence.

11. The non-transitory computer readable storage medium according to claim 9, wherein the obtain an object control model matching the target virtual object by adapting the obtained object model to a target skeleton comprises:

binding a key point in the obtained object model and the target skeleton, and skinning the object model on the target skeleton, to obtain the object control model matching the target virtual object.

12. The non-transitory computer readable storage medium according to claim 9, wherein the target skeleton comprises a general facial skeleton, and the object model comprises a facial model.

* * * * *